(12) United States Patent
Li

(10) Patent No.: US 10,969,552 B2
(45) Date of Patent: Apr. 6, 2021

(54) ADAPTER

(71) Applicant: SHENZHEN FIBERCAN OPTICAL CO., LTD., Shenzhen (CN)

(72) Inventor: Yaole Li, Shenzhen (CN)

(73) Assignee: SHENZHEN FIBERICAN OPTICAL CO., LTD., Shenzhen (CN)

( * ) Notice: Subject to any disclaimer, the term of this patent is extended or adjusted under 35 U.S.C. 154(b) by 0 days.

(21) Appl. No.: 16/541,949

(22) Filed: Aug. 15, 2019

(65) Prior Publication Data

US 2020/0200981 A1    Jun. 25, 2020

(30) Foreign Application Priority Data

Dec. 25, 2018   (CN) .......................... 201822194454.3
May 14, 2019   (CN) .......................... 201920680566.1

(51) Int. Cl.
  *G02B 6/38*          (2006.01)
(52) U.S. Cl.
  CPC ......... *G02B 6/3897* (2013.01); *G02B 6/3825* (2013.01); *G02B 6/3849* (2013.01)
(58) Field of Classification Search
  CPC ... G02B 6/3897; G02B 6/3849; G02B 6/3825
  See application file for complete search history.

(56) References Cited

U.S. PATENT DOCUMENTS

| 5,142,597 | A | * | 8/1992 | Mulholland | ......... | G02B 6/3874 |
| | | | | | | 385/55 |
| 5,446,818 | A | * | 8/1995 | Baker | .................. | G02B 6/3849 |
| | | | | | | 385/72 |
| 9,188,747 | B2 | * | 11/2015 | Gniadek | .................. | G02B 6/38 |
| 2015/0063758 | A1 | * | 3/2015 | McPhil Giraud | .... | G02B 6/3834 |
| | | | | | | 385/78 |
| 2017/0315307 | A1 | * | 11/2017 | Lee | ....................... | G02B 6/3869 |

FOREIGN PATENT DOCUMENTS

CN             206114972 U       4/2017

* cited by examiner

*Primary Examiner* — Leslie C Pascal
(74) *Attorney, Agent, or Firm* — Spectrum IP Law Group LLC

(57) ABSTRACT

Disclosed is an adapter, which includes a housing, a bushing and a sleeve, wherein the housing is provided with a plurality of receiving cavities for receiving the bushings, the bushing includes a support part and a hollow column on the support part, the bushing is mounted in the receiving cavity, a part of the sleeve is mounted within the hollow column of the bushing and another part is mounted within the receiving cavity. In the adapter of the present disclosure, a plurality of bushings/core clips can be mounted in one housing/outer frame, the adapter is integrated with multiple bushings, adapting multiple jumpers, which can effectively improve space utilization and reduce the cost of use; and no welding is required, which can effectively reduce the rejection rate in the production process and improve production efficiency, meanwhile, reduce the assembly processes and labor cost.

13 Claims, 9 Drawing Sheets

ADAPTER

CROSS-REFERENCE TO RELATED PATENT APPLICATIONS

This application claims priority to the Chinese patent application No 201822194454.3, filed on Dec. 25, 2018, entitled "adapter", and the Chinese patent application No. 201920680566.1, filed on May 14, 2019, entitled "an adapter", the entire contents of which are incorporated herein by reference.

TECHNICAL FIELD

The present disclosure relates to the field of communication technologies, and in particular, to an adapter.

BACKGROUND

Fiber optic adapters may be inserted into fiber optic connectors of different interface types to realize conversion between FC, SC, ST, LC, MTRJ, MPO, E2000 and other interfaces, they are widely used in optical distribution frames (ODF), optical fiber communication equipment, apparatus and so on, and with excellent performance, being stable and reliable.

Patent Document No. CN201621093644.0 discloses an integrated lightproof adapter including a housing, a core clip, a light-shielding elastic sheet and a dustproof cap, and the outer housing is an integral outer housing, and a cavity extending along the length is provided inside, two ends of the cavity are sealed by the dust proof caps, and the core clip and the light-shielding elastic sheet are fixed in the cavity, wherein the light-shielding elastic sheet can block the light path in the cavity when being erected, and is resisted by the external force and lays in the insertion direction when a foreign object is inserted into the adapter. However, one outer housing of the adapter can only adapt two jumpers (one on each side). If multiple jumpers need to be adapted, multiple adapters are needed, resulting in large space occupation and high material cost.

It can be seen that the existing adapter occupies more space, and arranging more fiber optics in a limited space is a major part of cost control. In addition, there are too many assembly steps of the existing adapter and it is difficult to assembly.

SUMMARY

An object of the present disclosure is to provide an integrated multi-connection adapter designed to improve space utilization, reduce assembly difficulty, and reduce cost.

The technical solutions adopted in the present disclosure are as follows.

An adapter includes a housing, a bushing and a sleeve, wherein the housing is provided with a plurality of receiving cavities for receiving the bushings, and wherein the bushing includes a support part and a hollow column on the support part, the bushing is mounted in the receiving cavity, a part of the sleeve is mounted within the hollow column of the bushing and another part is mounted within the receiving cavity.

In an embodiment, the bushing includes a support part and a plurality of hollow columns, the plurality of hollow columns are arranged on a first end of the support part, a receiving hole for receiving the sleeve is opened in the receiving cavity, and another part of the sleeve is mounted within the receiving hole.

The adapter can integrate multiple housings by providing a plurality of hollow columns on the bushing, so that one adapter can be adapted to multiple jumpers, which not only increases the capacity of the adapter, but also makes the adapter occupy a small space, and reduce the cost of materials.

Alternatively, the support part is provided with a limiting part, a limiting slot adapted to the limiting part is arranged in the receiving cavity.

Alternatively, the limiting part is provided with a snap part, the housing is provided with an engaging part adapted to the snap part.

Alternatively, the adapter further includes a shielding sheet arranged on the bushing.

Alternatively, the bushing is provided with a step, and the shielding sheet is engaged with the step.

Alternatively, the number of the hollow columns is not limited, and the number of the receiving cavities is not limited.

In another embodiment, the housing is an outer frame, the bushing is a core clip; the receiving cavity extends through a front end surface and a rear end surface of the outer frame; the outer frame may be integrally formed, the plurality of receiving cavities may be arranged in one or more rows.

The adapter adopts an integrated housing design on the one hand, which does not need welding, and requires simple installation, is easy to produce, and reduces labor cost; on the other hand, the multi-connection design method increases the installation port of a single adapter, reduces space waste caused by installing multiple adapters, and increases space utilization.

Alternatively, the core clip includes a support part and a hollow column, a convex hole is arranged in the receiving cavity, the convex hole is connected to an inner wall of the receiving cavity through a baffle plate, and the other part of the sleeve is mounted within the convex hole.

Alternatively, symmetric elastic positioning guiding arms are arranged on the support part of the core clip, symmetric convex blocks are arranged on the inner wall of the receiving cavity, when the core clip is inserted into the receiving cavity, the elastic positioning guiding arm is engaged after passing the convex block, so that the core clip is fixed in the receiving cavity.

Alternatively, the adapter includes symmetric elastic positioning guiding arms, a first guiding groove matched with the elastic positioning guiding arm is arranged in the receiving cavity, when the core clip is inserted into the receiving cavity, the elastic positioning guiding arm is dropped into the first guiding groove to guide and position for the inserting operation.

Alternatively, a plurality of ribs are arranged on the inner wall of the receiving cavity, the first guiding groove is formed between the ribs.

Alternatively, symmetrical positioning guiding peaks are arranged on the support part of the core clip, a second guiding groove matched with the positioning guiding peak is arranged in the receiving cavity, when the core clip is inserted into the receiving cavity, the positioning guiding peak is forward along the second guiding groove to guide and position for the inserting operation.

Alternatively, a limiting slot matched with the positioning guiding peak is arranged in the receiving cavity; when the core clip is inserted into the receiving cavity, the positioning guiding peak is dropped into the limiting slot for limiting the axial rotation of the core clip.

Alternatively, a plurality of ribs are arranged on the inner wall of the receiving cavity, the second guiding groove is formed between the ribs, the baffle plate is provided with a protrusion, and the limiting slot is formed between the adjacent rib and protrusion.

Alternatively, the adapter further includes an elastic sheet mounted to a left and/or right side of the outer frame.

In some embodiments, the adapter further includes a dustproof cap mounted on an end surface of the outer frame, including a front end surface and/or a rear end surface.

It can be seen from the above technical solutions that the embodiments of the present disclosure have the following advantages:
1. An integrated frame design is adopted, no welding is required, thus the rejection rate in the production process can be effectively reduced and production efficiency can be improved, meanwhile, the assembly processes and labor cost are reduced.
2. A multi-connection design is adopted, multiple outer core clips can be installed in one outer frame, multiple bushings can be integrated, and multiple jumpers can be adapted, thus space utilization can be effectively improved and the cost of use can be reduced.

BRIEF DESCRIPTION OF THE DRAWINGS

For more clearly illustrating the technical solutions of the embodiments of the present disclosure, the drawings used in the description of the embodiments will be briefly described below. It is obvious that the drawings in the following description are only some embodiments of the present disclosure. Those skilled in the art may also obtain other drawings based on these drawings without any creative effort.

FIG. 9-1 and FIG. 9-2 are a stereogram and a section view of a core clip according to an embodiment of the present disclosure, respectively;

FIG. 10-1 and FIG. 10-2 are section views of different directions of an outer frame according to an embodiment of the present disclosure, respectively;

DETAILED DESCRIPTION

The technical solutions of the embodiments of the present disclosure will be clearly and completely described in combination with the drawings in the embodiments of the present disclosure for those skilled in the art to better understand the solutions of the present disclosure. It should be noted that the described embodiments are merely some of the embodiments of the invention, and not all of the embodiments. All other embodiments obtained by those skilled in the art based on the embodiments of the present disclosure without creative efforts shall fall within the claimed scope of the present disclosure.

The terms "first", "second", "third" and the like in the specification and claims of the present disclosure and the above drawings are used to distinguish different objects, and are not intended to describe a specific order. Furthermore, the terms "comprise" and "have" and any deformation thereof are intended to cover a non-exclusive inclusion. For example, a process, method, system, product, or device that comprises a series of steps or units is not limited to the steps or units listed, but alternatively includes steps or units not listed, or alternatively, other steps or units inherent to these process, method, product or device are also included.

The detailed description will be respectively made below through specific embodiments.

First Example

Figure 1:
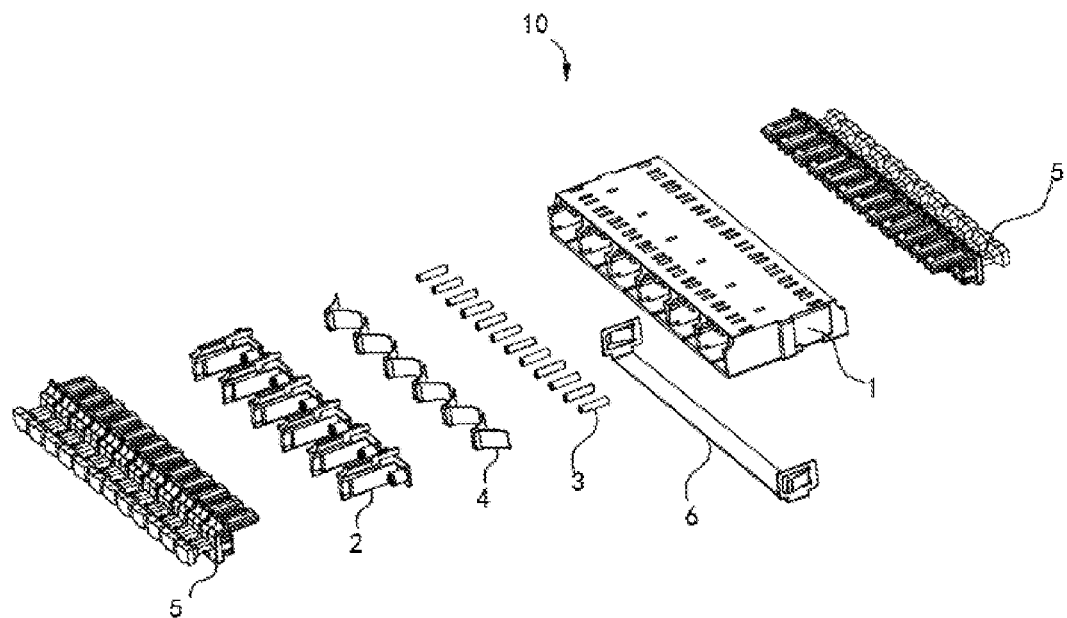
FIG. 1 is a schematic stereogram of an adapter according to an embodiment of the present disclosure.

FIG. 1 is a schematic stereogram of an adapter according to an embodiment of the present disclosure.

As can be seen in the figure, adapter 10 includes a housing 1, a bushing 2, a sleeve 3, a shielding sheet 4, a dustproof cap 5, and an elastic sheet 6, the housing 1 is provided with a plurality of receiving cavities 11 for receiving the bushings 2, the bushing 2 is mounted in the receiving cavity 11, one part of the sleeve 3 is installed in the bushing 2, and the other part is installed in the receiving cavity 11, the shielding sheet 4 is mounted on an end of the bushing 2 opposite to the sleeve 3, the dustproof cap 5 is mounted on an end surface of the housing 1, the elastic sheet 6 is worn in an opening at one end of the housing 1. In the present embodiment, the housing 1 is integrally injection molded, so that ultrasonic welding affecting the quality of the adapter 10 can be avoided.

In the present embodiment, the housing 1 is defined as an earless structure. It can be understood that in an alternative embodiment, the housing 1 can also be a structure with an ear part.

Figure 2:
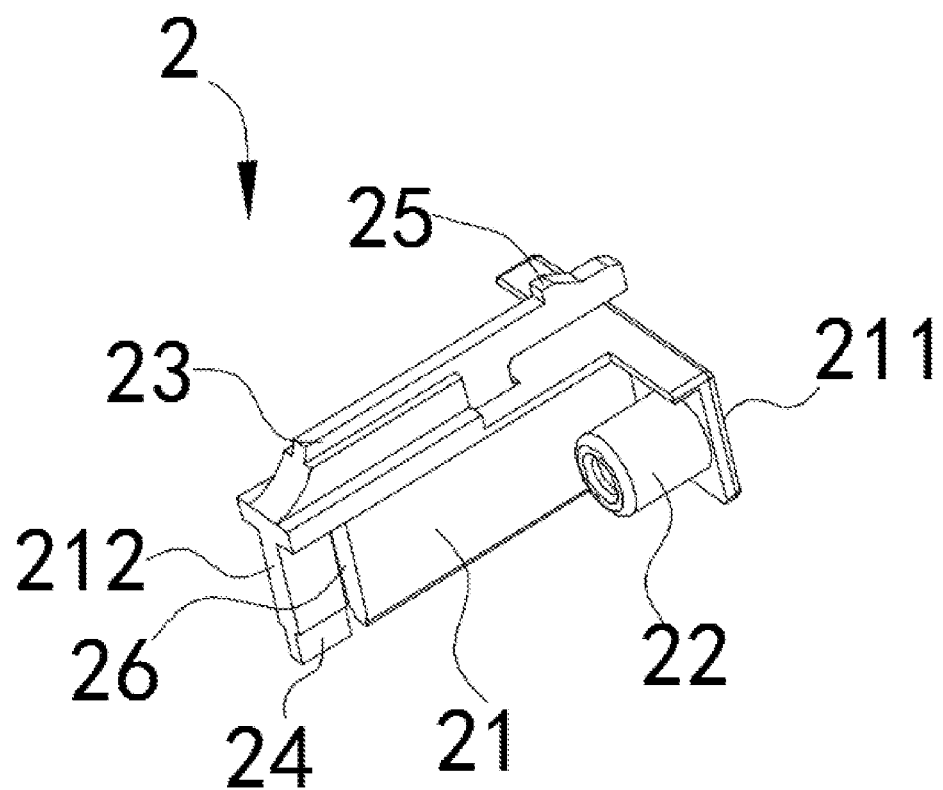
FIG. 2 is a schematic stereogram of a bushing according to an embodiment of the present disclosure.
Figure 3:
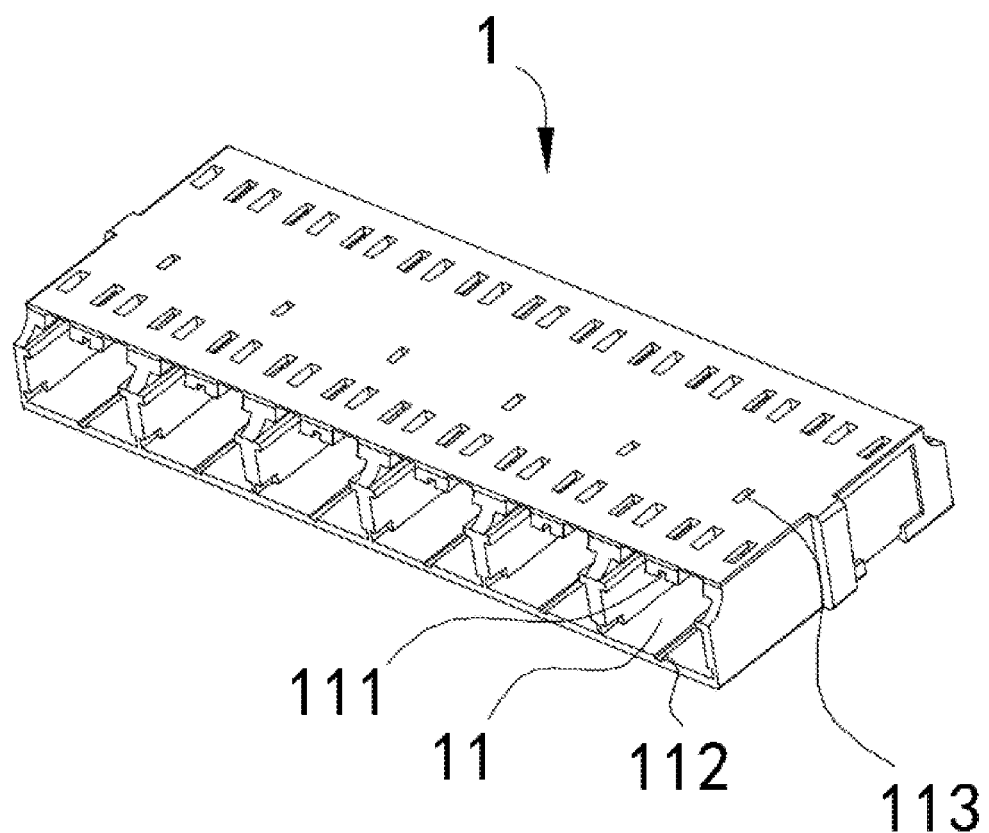
FIG. 3 is a schematic stereogram of the housing according to an embodiment of the present disclosure.

FIG. 2 is a schematic stereogram of a bushing according to an embodiment of the present disclosure, and FIG. 3 is a schematic stereogram of a housing according to an embodiment of the present disclosure.

As can be seen in the figure, the bushing 2 includes a support part 21 and a plurality of hollow columns 22, and the plurality of hollow columns 22 are arranged on a first end part 211 of the support part, and a receiving hole (not shown) for receiving the sleeve 3 is opened in the receiving cavity 11, a part of the sleeve 3 is mounted in the hollow column 22, and the other part is mounted in the receiving hole. In the illustrated embodiment, the hollow column 22 is defined as a hollow cylinder with a receiving hole defined as a circular hole. It can be understood that in an alternative embodiment, the hollow column 22 can also be a hollow prism, and an inner wall of the hollow column 22 can also be a diamond shape. As shown in FIG. 2, the support part 21 is provided with a first limiting part 23 and a second limiting part 24. The first limiting part 23 is arranged at the top of the support part 21, and the second limiting part 24 is arranged at the bottom of the support part 21. As shown in FIG. 3, a first limiting slot 111 adapted to the first limiting part 23 and a second limiting slot 112 adapted to the second limiting part 24 are arranged in the receiving cavity 11, the first limiting slot 111 is arranged at the top of the receiving cavity 11, and the second limiting slot 112 is arranged at the bottom of the receiving cavity 11. In the illustrated embodiment, the first limiting part 23 is defined as a protrusion extending upward along the top of the support part 21, and the second limiting part 24 is defined as a protrusion extending downward along the bottom of the support part 21.

In the illustrated embodiment, the first limiting part 23 is provided with a snap part 25, and a corresponding position of the housing 1 is provided with an engaging part 113 adapted to the snap part 25, and the bushing 2 is fixed to the housing 1 by the engagement of the snap part 25 with the engaging part 113, thereby preventing the bushing 2 from being loosened and dropping.

When the bushing 2 is installed, the first limiting part 23 of the bushing 2 is firstly aligned with the first limiting slot 111, the second limiting part 24 is aligned with the second limiting slot 112, and the bushing 2 slowly slides into the receiving cavity 11 until the snap part 25 is engaged with the engaging part 113.

Figure 4:
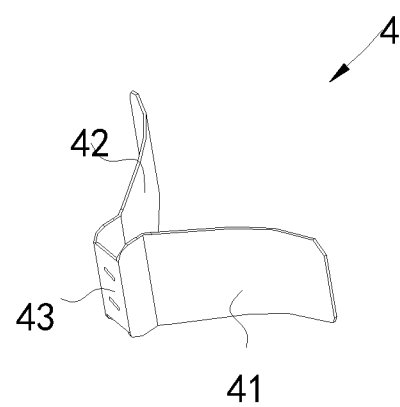
FIG. 4 is a schematic stereogram of a shielding sheet according to an embodiment of the present disclosure.

FIG. 4 is a schematic stereogram of a shielding sheet according to an embodiment of the present disclosure.

As can be seen from the figure, the shielding sheet 4 includes a first shielding part 41, a second shielding part 42 and a connecting part 43 connecting the first shielding part 41 and the second shielding part 42, the connecting part 43 is in a form of a U-shaped structure, the first shielding part 41 and the second shielding part 42 are in a form of a deployed wing. The shielding sheet 4 can effectively block the light leaked from the adapter 10, thereby improving the safety of the adapter 10.

In the illustrated embodiment, the second end part 212 of the support part is provided with a step 26, and the shielding sheet 4 is fixed to the bushing 2 by the engagement of the connecting part 43 with the step 26. The structure is convenient to disassemble and assemble, thereby improving the user experience.

Figure 5:
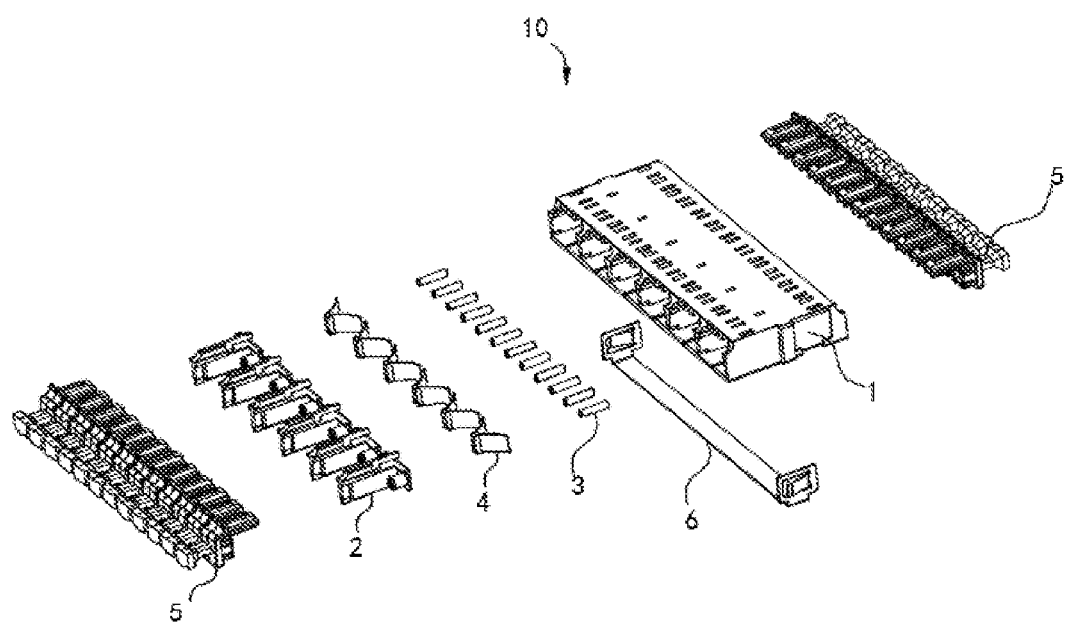
FIG. 5 is a schematic stereogram of an in-line arrangement adapter according to an embodiment of the present disclosure.

FIG. 5 is a schematic stereogram of an in-line arrangement adapter according to an embodiment of the present disclosure.

As can be seen from the figure, two sides of the support part 21 of the adapter 10 are each provided with a hollow column 22, and the housing 1 is provided with six receiving cavities 11, and each of the receiving cavities 11 is provided with two receiving holes for receiving the sleeves 3. It can be seen that one adapter 10 can be adapted to twenty-four jumpers with twelve on the left and twelve on the right, which greatly increases the capacity of the adapter 10, so that the space occupied by the adapter 10 is small; by increasing the space occupancy of the adapter 10, material cost is thereby reduced. The embodiment is more suitable for applying in places with a wide space.

Figure 6:
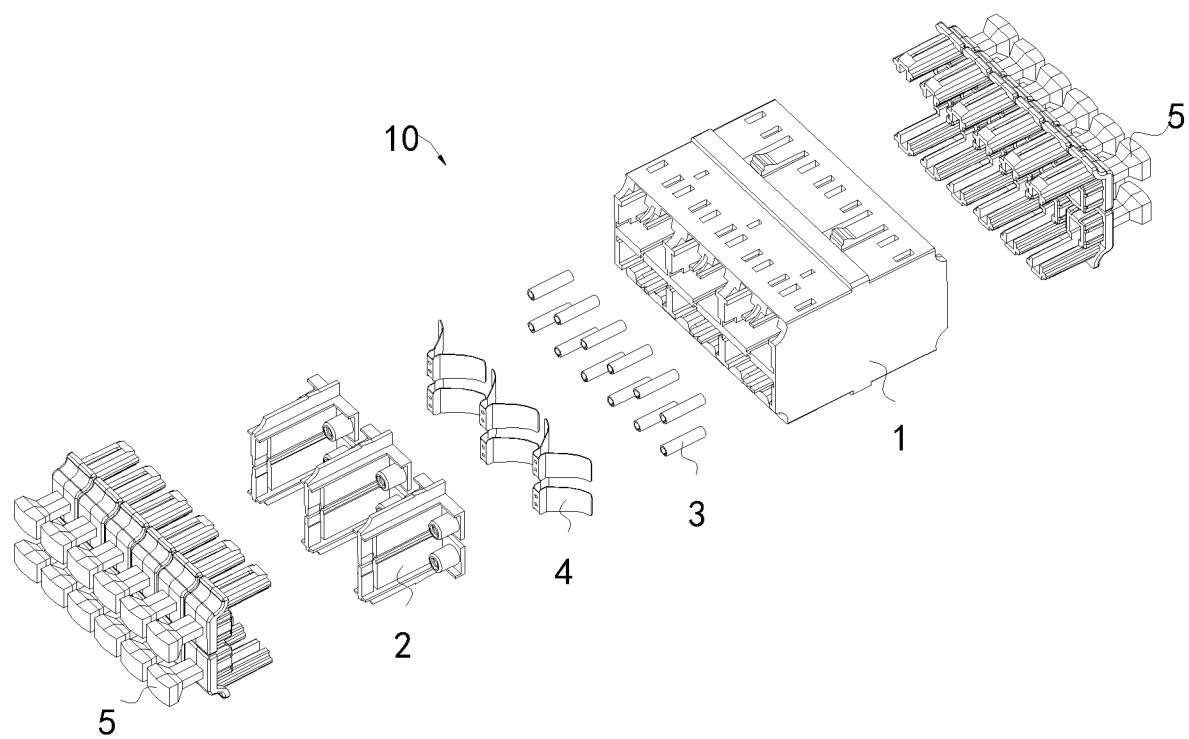
FIG. 6 is a schematic stereogram of a backrest arrangement adapter according to an embodiment of the present disclosure.

FIG. 6 is a schematic stereogram of a backrest arrangement adapter according to an embodiment of the present disclosure.

As can be seen from the figure, two sides of the support part 21 of the adapter 10 are each provided with two hollow columns 22, and three sets of back-to-back receiving cavities 11 are opened in the housing 1, and four receiving holes for receiving the sleeves 3 are opened in each set of the receiving cavities 11. It can be understood that one adapter 10 can be adapted to twenty-four jumpers, which greatly increases the capacity of the adapter 10, so that the space occupied by the adapter 10 is small; and by increasing the space occupancy of the adapter 10, the material cost is thereby reduced. The embodiment is more suitable for applying in places with high space. According to the above two embodiments, the applicability of the adapter 10 can be improved.

Assembly process: firstly, the sleeve 3 is placed in the hollow column 22 of the bushing 2, secondly, the shielding sheet 4 is engaged with the step 26 of the bushing 2, and the bushing 2 is again mounted into the receiving cavity 11 of the housing 1, wherein the elastic sheet 6 is worn in an in-line arrangement, the dustproof cap 5 is finally inserted into an end surface of the housing 1.

Second Example

Figure 7:
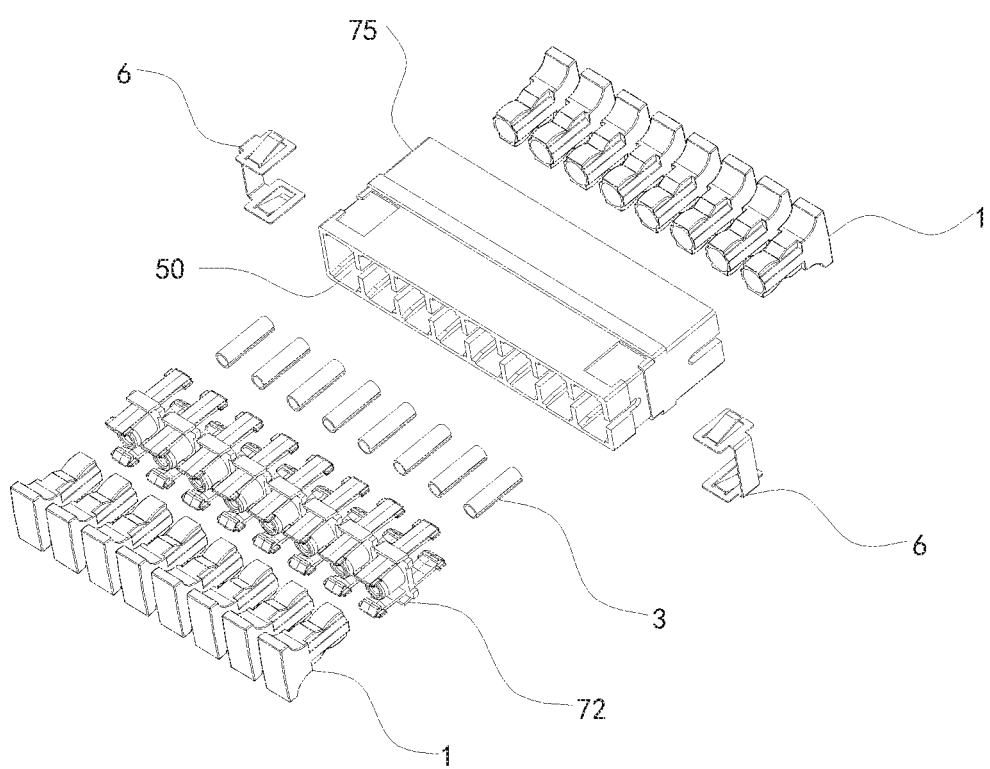
FIG. 7 is an exploded structural schematic view of an adapter according to an embodiment of the present disclosure.
Figure 8:
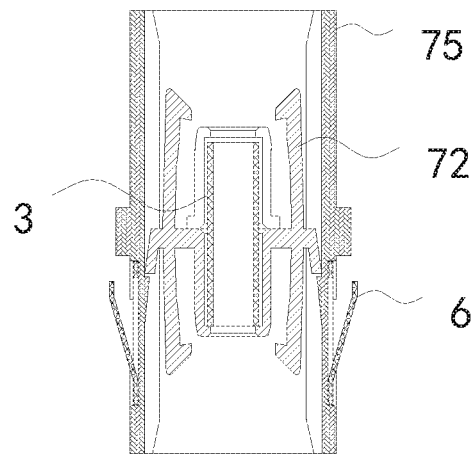
FIG. 8 is a structural schematic view showing a housing and a core clip being assembled into an outer frame according to an embodiment of the present disclosure.
Figures 1, 9:
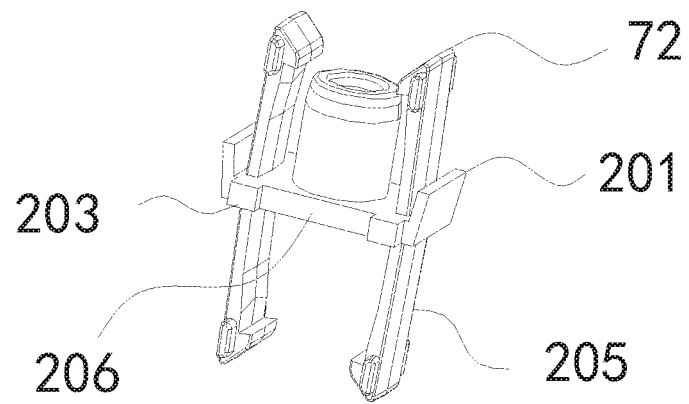
Figures 2, 9:
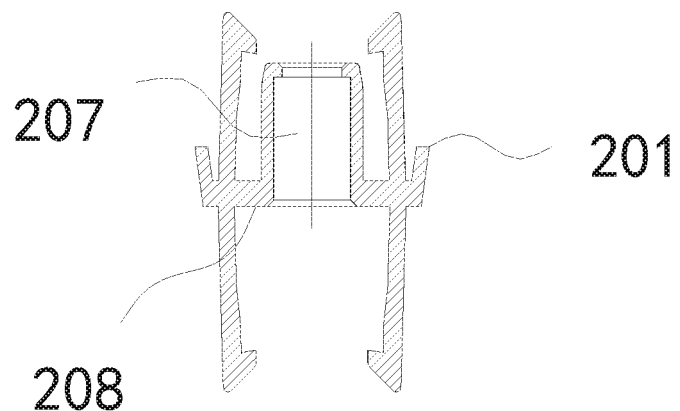
Figures 1, 10:
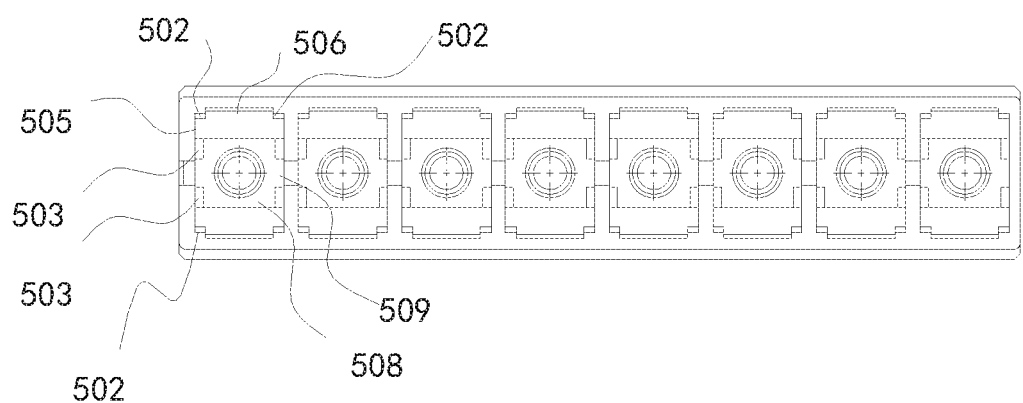
Figures 2, 10:
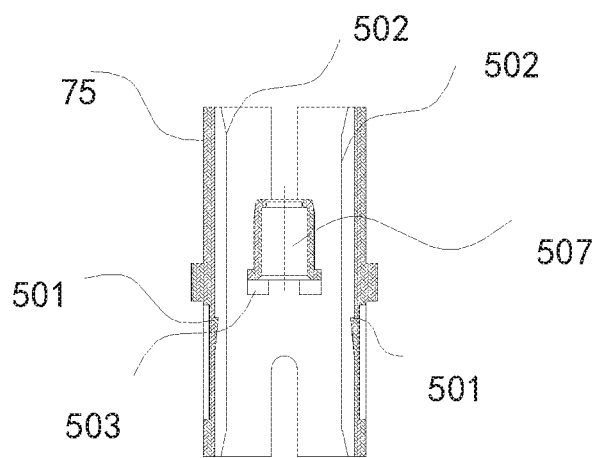

Referring to FIG. 7 and FIG. 8, they are exploded structural schematic views of an adapter according to an alternate embodiment of the present disclosure. As can be seen from the figures, the adapter includes: an outer frame 75, a core clip 72 and a sleeve 3; the outer frame 75 is provided with a plurality of receiving cavities 50 for receiving the core clips 72, the core clip 72 includes a support part 208 and a hollow column 207 on the support part 208; the core clip 72 is mounted in the receiving cavity 50, a part of the sleeve 3 is mounted in the hollow column 207 of the core clip 72, and another part is mounted in the receiving cavity 50.

Further, the receiving cavity 50 extends through a front end surface and a rear end surface of the outer frame 75; the outer frame 75 is integrally formed, and the plurality of receiving cavities 50 are arranged in a multi-connection form of one or more rows. There are eight receiving cavities 50 arranged in one row as shown in the figure, but in other embodiments, they may be arranged in two or more rows.

In addition, it should be noted that the outer frame 75 may also be referred to as a housing, and the core clip 72 may also be referred to as a bushing, that is, the outer frame 75 and the core clip 72 respectively correspond to the housing and the bushing 2 in the first embodiment, and play a similar role, but the specific structural characteristics thereof are different, and with some improvements.

The sleeve 3 can be a ceramic sleeve.

Referring to FIG. 9-1 and FIG. 9-2 and FIGS. 10-1 and 10-2:

Alternatively, the receiving cavity is provided with a convex hole 507. The convex hole 507 is connected to an inner wall of the receiving cavity 50 through the baffle plate 508, and the other part of the sleeve 3 is specifically mounted in the convex hole 507. The convex hole 507 acts to receive the sleeve 3 and may also be referred to as a receiving hole.

Alternatively, the support part 208 of the core clip 72 is provided with symmetric elastic positioning guiding arms 201. The inner wall of the receiving cavity 50 is provided with symmetric convex blocks 501. When the core clip 72 is inserted into the receiving cavity, the elastic positioning guiding arm 201 passes over the convex block 501, the convex block 501 will prevent the elastic positioning guiding arm 201 from retreating, and further, the core clip 72 is fixed in the receiving cavity 50.

Alternatively, the receiving cavity 50 is provided with a first guiding groove 506 matching the elastic positioning guiding arm 201. When the core clip 72 is inserted into the receiving cavity 50, the elastic positioning guiding arm 201 drops into the first guiding groove 506 to guide and position the inserting operation.

Alternatively, a plurality of ribs 502 are arranged on the inner wall of the receiving cavity 50. Alternatively, the receiving cavity 50 has a substantially square or rectangular cross section, and a rib 502 may be arranged at each of its four corners. Between the two upper adjacent ribs 502 and between the lower two ribs 502, or in other words, between the two ribs 502 which are closer to each other, first guiding grooves 506 are respectively formed, and the two first guiding grooves 506 are respectively arranged in the upper and the lower portion of the receiving cavity 50.

Alternatively, the core clip 72 is further provided with symmetrical elastic arms 205. The elastic arm 205 and the elastic positioning guiding arm 201 are arranged on the same side of the core clip 72, but the elastic positioning guiding arm 201 is arranged outside. The elastic arm 205 can also serve as a guide, when the core clip 72 is inserted into the receiving cavity 50 of the outer frame 75, the elastic positioning guiding arm 201 and the elastic arm 205 can be pushed in correspondingly to the first guiding groove 506 of the outer frame 75.

Alternatively, the support part of the core clip 72 is provided with symmetric positioning guiding peaks 203, and the receiving cavity 50 is provided with second guiding grooves 509 matched with the positioning guiding peaks 203. When the core clip 72 is inserted into the receiving cavity 50, the positioning guiding peak 203 is forward along the second guiding groove 509 to guide and position for the inserting operation.

Alternatively, the receiving cavity 50 is provided with a limiting slot 505 matched with the positioning guiding peak 203; when the core clip 72 is inserted into the receiving cavity 50, the positioning guiding peak 203 drops into the limiting groove 505 along the second guiding groove 509 for limiting the axial rotation of the core clip 72.

Alternatively, the baffle plate 508 is provided with protrusions 503 arranged around the periphery, and the limiting slot 505 is formed between the rib 502 and the protrusion 503 which are adjacent. A second guiding groove 509 is formed between the two adjacent ribs 502 which are in a long distance, and the two second guiding grooves 509 are respectively arranged on the left side and the right side of the receiving cavity 50. That is, second guiding grooves 509 are respectively formed between the upper and lower two ribs 502 on the left side and between the upper and lower two ribs 502 on the right side.

A slot 206 may be formed between the adjacent positioning guiding peaks 203 on the support part 208. The slot 206 may be used to avoid the protrusions 503 provided on the baffle plate 508.

Alternatively, the adapter further includes a dustproof cap 1 mounted at an opening of the receiving cavity 50 of the front end surface and/or the rear end surface of the outer frame 75.

Alternatively, the adapter further comprises an elastic sheet 6 mounted on the left side and/or the right side of the outer frame 75.

Figure 11:
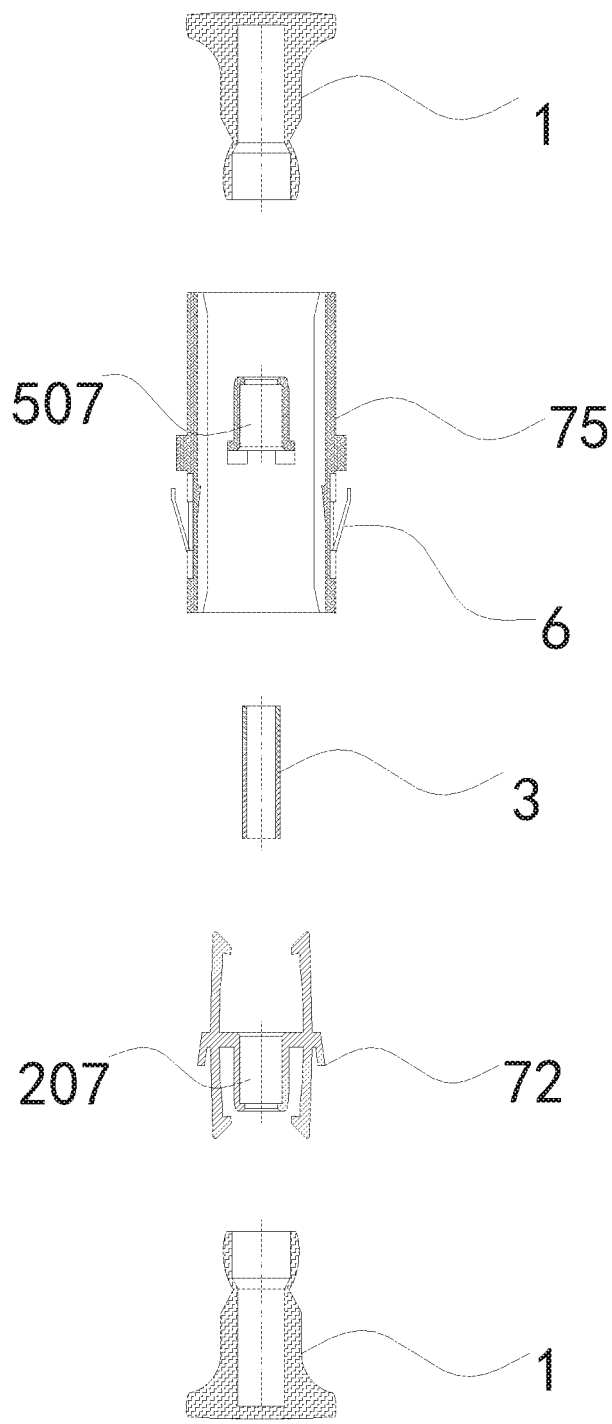
FIG. 11 is a schematic view showing the assembly of an adapter according to an embodiment of the present disclosure.

Referring to FIG. 7, FIG. 8 and FIG. 11, the assembly process of the adapter of the present disclosure is as follows:

One end of the sleeve 3 is fitted into the hollow cylinder 207 of the core clip 72, and the core clip 72 with the sleeve 3 fitted is mounted into the receiving cavity 50 of the outer frame 75, wherein the other end of the sleeve 3 is sleeved in the convex hole 507 of the outer frame 75, so that the sleeve 3 is fixed in a cavity formed by the hollow column 207 of the core clip 72 and the convex hole 507 of the outer frame 75.

When the core clip 72 is inserted into the receiving cavity 50 of the outer frame 75, the elastic positioning guiding arm 201 and the elastic arm 205 on the core clip 72 are pushed in correspondingly to the first guiding groove 506 of the outer frame 75, after the elastic positioning guiding arm 201 passing over the convex block 501, the support part 208 of the core clip 72 abuts against the baffle plate 508 of the outer frame 75, the convex block 501 prevents the elastic positioning guiding arm 201 from retreating, and fixes the core clips 72 in the cavity 50 of the outer frame 75, and each of the hollow column 207 and the convex hole 507 has a U-shaped structure at its one end to form a cavity, and the sleeve 3 is fixed in the cavity.

Meanwhile, the elastic positioning guiding arm 201 is engaged with the first guiding groove 506, and the positioning guiding peak 203 is engaged with the limiting slot 505, thus preventing the core clip 72 from rotating axially in the outer frame 75, and the core clip 72 is completely fixed in the outer frame 75.

The two elastic sheets 6 are then respectively inserted into the mounting holes on both sides of the outer frame 75, and the dustproof caps 1 are respectively fitted into the two ends of the outer frame 75 to complete the assembly.

The process reduces the steps of welding and assembling the outer frame comparing with the prior art.

The disclosure uses an earless integrated 8-connection as a demonstration, and does not limit its number of multiple connections, which includes arrangements with ear and earless arrangements.

As described above, the present disclosure avoids the process of welding and eliminates the welding equipment cost and labor cost by designing the outer frame 75 into an integrated multi-connection structure, thereby reducing the rejection rate caused by welding. At the same time, due to the multi-connection of the outer frames, the space wasted by installing multiple single-connection adapters is effectively reduced.

It can be seen from the above technical solutions that the embodiments of the present disclosure have the following advantages:
1. An integrated frame design is adopted, no welding is required, thus the rejection rate in the production process can be effectively reduced and production efficiency can be improved, meanwhile, the assembly processes and labor cost are reduced.
2. A multi-connection design is adopted, multiple outer core clips can be installed in one outer frame, multiple bushings can be integrated, and multiple jumpers can be adapted, thus space utilization can be effectively improved and the cost of use can be reduced.

In the above embodiments, the descriptions of the various embodiments have their respective focuses, and the parts that are not described in detail in a certain embodiment can be referred to the related description of other embodiments.

It should be noted that, in the above embodiments, technical features may be referred to or replaced with each other. For a part that is not described in detail in an embodiment, reference may be made to the description in another embodiment, the technical solutions obtained by combining the above embodiments also fall within the protection scope of the present disclosure.

The above embodiments are only used to illustrate the technical solutions of the present disclosure, and are not limited thereto; those skilled in the art shall understand that they can still amend the technical solutions described in the above embodiments, or make equivalent replacement of some of the technical features; the amendments and replacement of the present disclosure do not depart from the spirit and scope of the technical solutions of the embodiments of the present disclosure.

What is claimed is:

1. An adapted, comprising:
a housing, a shielding sheet, a bushing and a sleeve, wherein the housing is provided with a plurality of receiving cavities for receiving the bushing, the bushing comprises a support part and a plurality of hollow columns on the support part, the plurality of hollow columns are arranged on a first end of the support part, the bushing is mounted in the receiving cavity, a part of the sleeve is mounted within the hollow column of the bushing and another part is mounted within the receiving cavity;
wherein a receiving hole for receiving the sleeve is opened in the receiving cavity, and the other part of the sleeve is mounted within the receiving hole, wherein the shielding sheet is arranged on the bushing, the bushing is provided with a step, and the shielding sheet is engaged with the step.

2. The adapter of claim 1, wherein the support part is provided with a limiting part, and a limiting slot adapted to the limiting part is arranged in the receiving cavity.

3. The adapter of claim 2, wherein the limiting part is provided with a snap part, and the housing is provided with an engaging part adapted to the snap part.

4. The adapter of claim 1, wherein the adapter further comprises a dustproof cap mounted on an end face of the housing.

5. The adapter of claim 1, wherein the housing is an outer frame, the bushing is a core clip; the receiving cavity extends through a front end surface and a rear end surface of the outer frame; the outer frame is integrally formed, the plurality of receiving cavities are arranged in one or more rows.

6. The adapted of claim 5, wherein the core clip comprises a support part and a hollow column, a convex hole is arranged in the receiving cavity, the convex hole is connected to an inner wall of the receiving cavity through a baffle plate, and the other part of the sleeve is mounted within the convex hole.

7. The adapted of claim 6, wherein symmetric elastic positioning guiding arms are arranged on the support part of the core clip, symmetric convex blocks are arranged on the inner wall of the receiving cavity, when the core clip is inserted into the receiving cavity, the elastic positioning guiding arm is engaged after passing the convex block, so that the core clip is fixed in the receiving cavity.

8. The adapter of claim 7, wherein a first guiding groove matched with the elastic positioning guiding arm is arranged in the receiving cavity, when the core clip is inserted into the receiving cavity, the elastic positioning guiding arm is dropped into the first guiding groove to guide and position for the inserting operation.

9. The adapter of claim 8, wherein a plurality of ribs are arranged on the inner wall of the receiving cavity, the first guiding groove is formed between the ribs.

10. The adapter of claim 6, wherein symmetrical positioning guiding peaks are arranged on the support part of the core clip, a second guiding groove matched with the positioning guiding peak is arranged in the receiving cavity, when the core clip is inserted into the receiving cavity, the positioning guiding peak is forward along the second guiding groove to guide and position for the inserting operation.

11. The adapter of claim 10, wherein a limiting slot matched with the positioning guiding peak is arranged in the receiving cavity; when the core clip is inserted into the receiving cavity, the positioning guiding peak is dropped into the limiting slot for limiting the axial rotation of the core clip.

12. The adapter of claim 11, wherein a plurality of ribs are arranged on the inner wall of the receiving cavity, the second guiding groove is formed between the ribs, the baffle plate is provided with a protrusion, and the limiting slot is formed between an adjacent rib and the protrusion.

13. The adapter of claim 5, further comprising an elastic sheet mounted to a left and/or right side of the outer frame.

* * * * *